United States Patent [19]

Nelson

[11] Patent Number: 5,445,259

[45] Date of Patent: Aug. 29, 1995

[54] HIGH STRENGTH ELECTROMAGNETIC COUPLING DISC

[75] Inventor: Dennis J. Nelson, Rockford, Ill.

[73] Assignee: Dana Corporation, Toledo, Ohio

[21] Appl. No.: 114,320

[22] Filed: Aug. 30, 1993

[51] Int. Cl.6 ............ F16D 27/112; F16D 27/14
[52] U.S. Cl. ............ 192/107 R; 192/84 C; 335/281; 335/296
[58] Field of Search ............ 192/107 R, 84 C; 335/296, 281

[56] References Cited

U.S. PATENT DOCUMENTS

| 2,739,684 | 3/1956 | Meyer | 192/84 |
|---|---|---|---|
| 2,860,403 | 11/1958 | Meyer | 29/155.59 |
| 3,088,567 | 5/1963 | Fischer et al. | 192/84 C |
| 3,149,705 | 9/1964 | Shoquist | 192/84 C |
| 3,205,989 | 9/1965 | Mantey | 192/84 C |
| 3,332,145 | 7/1967 | Klinkenberg | 29/607 |
| 3,712,439 | 1/1973 | Schacher et al. | 192/84 C |
| 4,122,930 | 10/1978 | Bennett et al. | 192/84 C |
| 4,187,939 | 2/1980 | Silvestrini et al. | 192/84 |
| 4,287,976 | 9/1981 | Sakaki et al. | 192/84 C |
| 4,685,202 | 8/1987 | Booth et al. | 29/607 |
| 4,818,840 | 4/1989 | Booth et al. | 219/121.72 |
| 4,891,077 | 1/1990 | Roll et al. | 148/9 R |
| 4,891,619 | 1/1990 | Booth et al. | 335/296 |
| 4,896,757 | 1/1990 | Seager, Sr. | 192/84 C |
| 4,951,797 | 8/1990 | Booth et al. | 192/107 R |
| 5,096,036 | 3/1992 | Booth et al. | 192/107 R |
| 5,125,255 | 6/1992 | Brown et al. | 72/334 |
| 5,305,865 | 4/1994 | Larson et al. | 192/84 C |

FOREIGN PATENT DOCUMENTS

| 0215962 | 4/1987 | European Pat. Off. . |
| 0339431 | 11/1989 | European Pat. Off. . |
| 2073764 | 10/1971 | France . |
| 0160631 | 9/1983 | Japan ............ 192/84 C |
| 769162 | 2/1957 | United Kingdom . |
| 1393285 | 5/1975 | United Kingdom . |
| 2017232 | 10/1979 | United Kingdom . |

OTHER PUBLICATIONS

Search Report completed on Dec. 8, 1994.

Primary Examiner—Rodney H. Bonck
Attorney, Agent, or Firm—Leydig, Voit & Mayer, Ltd.

[57] ABSTRACT

A coupling disc (e.g., the armature or rotor) of an electromagnetic coupling such as a clutch or brake is formed with a plurality of concentric rows of specially shaped slots which are filled with high magnetic reluctance brazing material in order to structurally strengthen the disc and reduce the tendency of the disc to deflect and bend under high loads. Optionally, an annulus of the brazing material may interconnect the rings and may back and support the non-working face of the disc to further strengthen the disc.

24 Claims, 2 Drawing Sheets

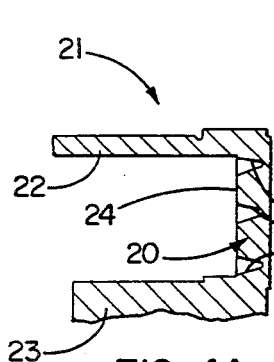
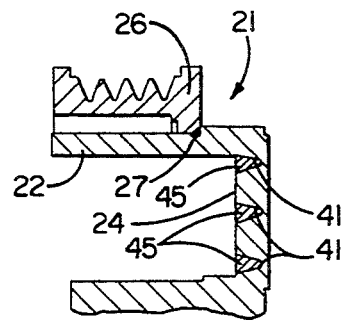
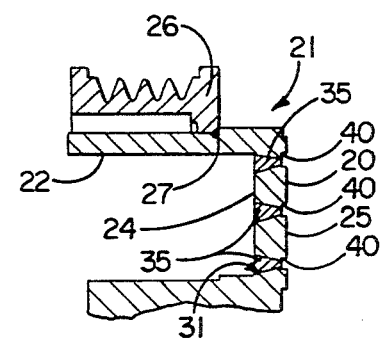
FIG. 4A　　　　FIG. 4B　　　　FIG. 4C
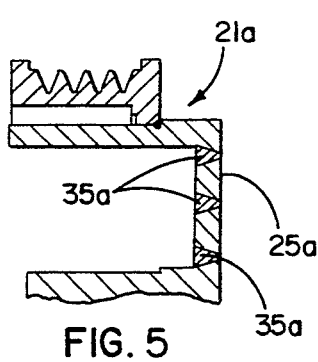
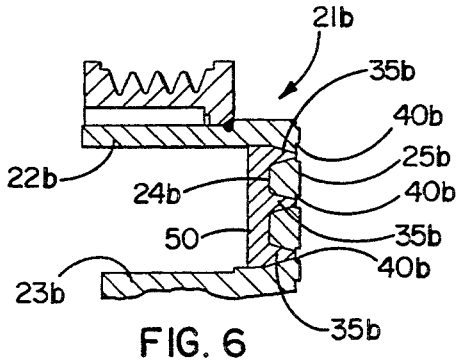
FIG. 5　　　　　　FIG. 6
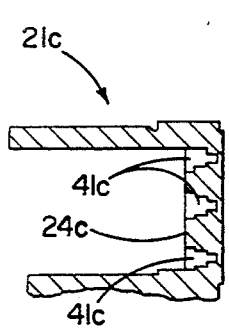
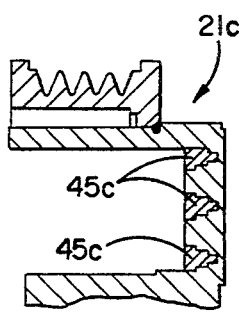
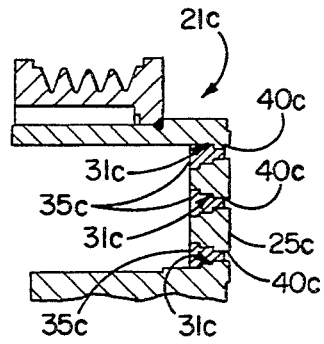
FIG. 7A　　　FIG. 7B　　　FIG. 7C
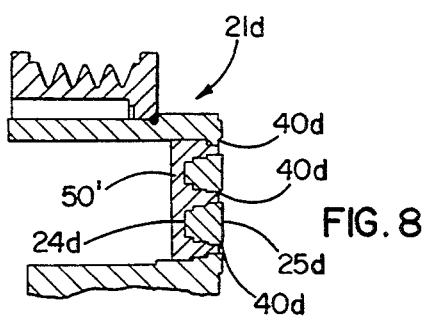
FIG. 8

HIGH STRENGTH ELECTROMAGNETIC COUPLING DISC

BACKGROUND OF THE INVENTION

This invention relates to multiple pole coupling discs of the type used in an electromagnetic coupling such as an electromagnetic clutch or brake. The coupling disc may be part of a rotary or non-rotary field or may be a rotary or non-rotary armature.

A typical electromagnetic coupling is disclosed in Silvestrini et al U.S. Pat. No. 4,187,939 and, in that particular case, the coupling is an electromagnetic clutch having a rotary armature disc made of material having low magnetic reluctance such as steel and having a field with a rotor which also is made of steel. When the coil of the field is excited, magnetic flux threads a path between the rotor and the axially opposing armature and attracts the armature into engagement with the working face of the rotor to couple the two for rotation in unison. The working face of the rotor is defined by one face of a disc which forms part of the rotor.

The coupling disc of the present invention is particularly useful in conjunction with a rotor which is used, for example, in the clutch of a vehicular air conditioning compressor. A pulley is attached to an outer pole ring of the rotor and is driven by an endless belt. When the clutch is engaged, the rotor is subjected to relatively heavy belt loads.

Rotors which are particularly useful with the clutches of air conditioner compressors are disclosed in detail in Booth et al U.S. Pat. No. 4,685,202; Roll et al U.S. Pat. No. 4,891,077; Booth et al U.S. Pat. No. 4,891,619; Booth et al U.S. Pat. No. 4,951,797; Booth et al U.S. Pat. No. 5,096,036 and Brown et al U.S. Pat. No. 5,125,255. The rotors disclosed in those patents have comparative advantages and disadvantages but, in a general sense, they share a common disadvantage. That is to say, such rotors are generally not suitable for use when in the form of a relatively small diameter rotor which must be capable of carrying heavy belt loads without failing structurally, which must be comparatively light in weight and which, at the same time, must possess acceptable magnetic characteristics. For the most part, the rotors disclosed in the above patents include coupling discs formed with radially spaced rows of angularly spaced "banana" slots which are separated by relatively narrow webs or bridges. If the rotor disc is of relatively small diameter and is thin in an axial direction, the webs eventually bend under heavy belt loads and lead to structural failure of the rotor.

SUMMARY OF THE INVENTION

The general aim of the present invention is to provide a new and improved coupling disc which is capable of sustaining heavy loads while being of relatively small diameter and relatively light weight and while possessing superior magnetic characteristics.

A more detailed object of the invention is to achieve the foregoing by providing a coupling disc with uniquely shaped slots which are filled with high magnetic reluctance material to increase the structural strength of the disc while delineating well-defined magnetic poles which are subject to reduced flux leakage.

A further object of the invention is to reinforce the non-working face of the coupling disc with an annulus of the same high magnetic reluctance material used to fill the slots so as to further increase the structural strength of the disc.

The invention also resides in the ability to join a drive pulley to a rotor in the same operation which is used to join the high magnetic reluctance material to the walls of the slots in the coupling disc of the rotor.

These and other objects and advantages of the invention will become more apparent from the following detailed description when taken in conjunction with the accompanying drawings.

BRIEF DESCRIPTION OF THE DRAWINGS

FIGS. 4A and 4B are cross-sectional views showing successive steps of making the rotor of FIGS. 1–3.

FIGS. 5 and 6 are views similar to FIG. 4C but show two modified versions of rotors according to the invention.

FIGS. 7A, 7B and 7C are views similar to FIGS. 4A, 4B and 4C, respectively, but show successive steps of making still another embodiment of a rotor.

FIG. 8 is a view similar to FIG. 7C but shows yet another embodiment.

Figure 1:
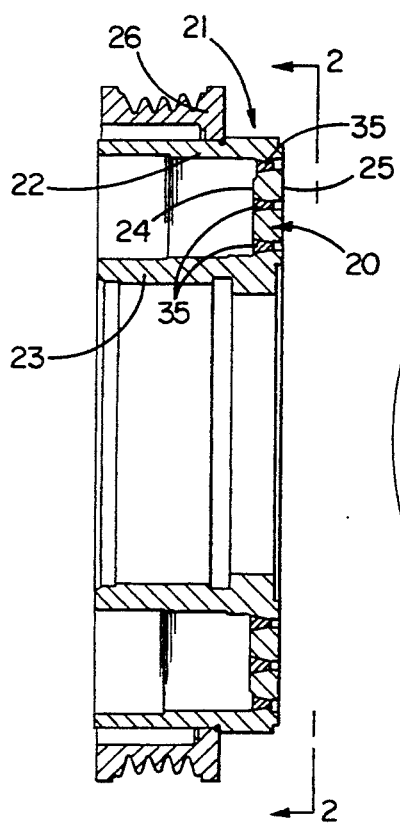
FIG. 1 is a cross-sectional view taken axially through an electromagnetic clutch rotor equipped with one embodiment of a new and improved coupling disc incorporating the unique features of the present invention.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

Detailed Description of the Preferred Embodiments

The drawings illustrate the present invention as being incorporated in a coupling disc 20 for use in an electromagnetic coupling such as an electromagnetic brake or clutch. While the disc could be an armature, it herein is shown as forming part of a clutch rotor 21 which may, for example, be of the type disclosed in the aforementioned Silvestrini et al patent. In this particular instance, the rotor is circular in shape and includes an axially extending outer flange 22 and an axially extending inner hub 23 which preferably are integral with one face 24 of the disc 20. The opposite face 25 of the disc forms the working face of the rotor 21 and is adapted to frictionally engage the armature of the clutch. The flange 22 and the hub 23 define the outer and inner pole rings, respectively, of the rotor 21.

As is conventional, the rotor 21 is made of low reluctance magnetic material such as steel (e.g., AISI 1010 steel). While the rotor could be cast and then machined, it preferably is formed by a stamping or drawing operation.

The rotor 21 is particularly adapted for use in the electromagnetic clutch of a vehicular air conditioner compressor and, to this end, a poly-V pulley 26 encircles and is joined to the outer pole ring 22. The rotor is driven from the vehicle engine by a poly-V belt (not shown) adapted to be trained around the pulley. Herein, the pulley 26 is joined to the pole ring 22 by brazing, there being an annulus of brazing material 27 (FIG. 3) between the outer periphery of the outer pole ring and the inner periphery of the forward end portion of the pulley. The brazing material initially is in the form of a paste (e.g., a copper-based brazing paste) which is filled into an annular groove 28 around the outer pole ring. When the rotor 21 is heated in a brazing oven, the brazing material fuses the pulley to the rotor.

The specific rotor 21 which has been illustrated in FIGS. 1–4 forms part of a six-pole clutch and thus the disc 20 includes three concentric bands 30 (FIG. 3) which carry less magnetic flux than the remaining areas of the disc. One magnetic pole is defined by that annular area of the disc located radially inwardly of the inner band, two poles are defined by the annular area between the inner band and the middle band, two additional poles are defined by the annular area between the middle band and the outer band, and the sixth pole is defined by the annular area located outwardly of the outer band.

In accordance with the present invention, the bands 30 are uniquely constructed to impart better structural strength and improved magnetic characteristics to the rotor 21. As a result of the construction of the bands, a relatively small-diameter rotor can withstand comparatively high belt loads and, in addition, the weight and axial dimension of the rotor may be reduced.

In the embodiment of FIGS. 1–4, each band 30 is formed in part by a circumferentially continuous slot 31 which preferably extends completely through the disc between the working and non-working faces 25 and 24 thereof. Advantageously, each slot includes inner and outer side walls 32 which are inclined at oblique angles so as to converge symmetrically toward one another as the slot progresses from the non-working face 24 toward the working face 25.

Pursuant to the invention, each slot 31 is filled with a ring 35 of high magnetic reluctance material which is joined intimately to the walls 32 of the slot. The material from which the rings are formed preferably is a copper-based brazing paste which, when subjected to the heat of a brazing oven, becomes fused to the walls of the slots.

The high reluctance rings 35 in the slots 31 define barriers resistant to the passage of magnetic flux and thus delineate the magnetic poles of the rotor 21. By virtue of filling the slots 31, the copper rings 35 add substantial strength to the rotor disc 20 and thus reduce the danger of the disc deflecting, bending or otherwise failing under heavy torque loads. Since the rings 35 strengthen the disc, the axial thickness of the disc itself may be reduced significantly so as to reduce both the weight and the axial dimension of the rotor 21.

By virtue of the inclined walls 32 of the slots 31, each ring 35 is narrow at the working face 25 of the rotor 21 in order to enable the overall radial width of the face to be kept small. At the working face, relatively wide bands of steel are located between adjacent rings 35 to provide high flux density areas as required for magnetic flux transfer. Moreover, each ring 35 is shaped so that it increases in radial width while the steel pole faces between adjacent rings decrease in radial width as the disc 20 wears and the air gap between the disc and the opposing armature becomes wider. This modulates the torque of the clutch so as to reduce the tendency of the torque to overshoot during initial impact of the armature against the rotor disc.

To further improve the magnetic characteristics of the disc 20, shallow and circular grooves 40 (FIG. 3) may be formed in the working face 25 of the disc. The grooves are circumferentially continuous and are aligned radially with the rings 35. The grooves help reduce flux leakage and establish better magnetic pole definition in the disc. The radial width of each groove 40 is at least as great as the radial width of the forward end of the corresponding ring 35.

Figure 2:
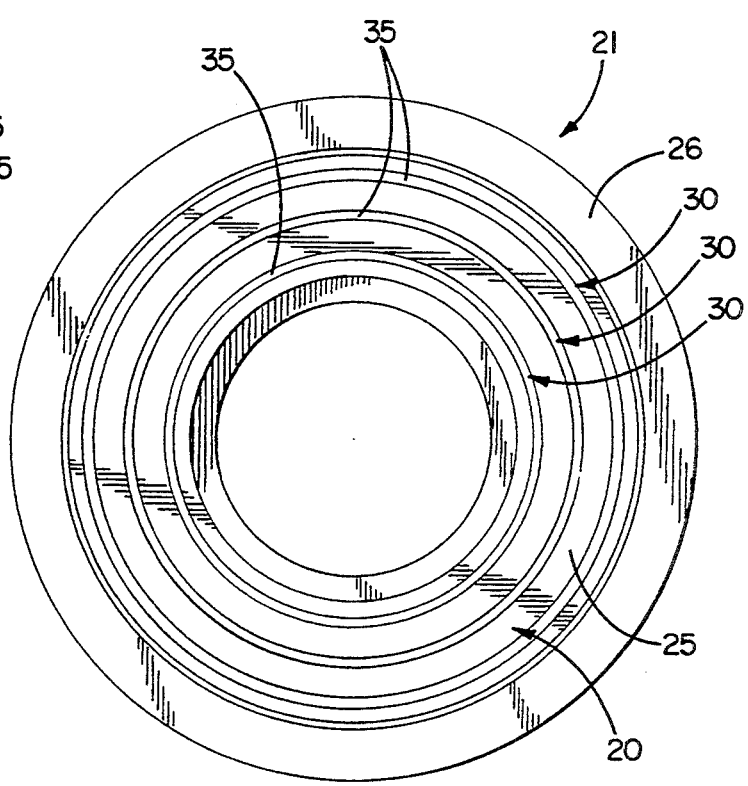
FIG. 2 is a front elevational view of the rotor as seen along the line 2—2 of FIG. 1.
Figure 3:
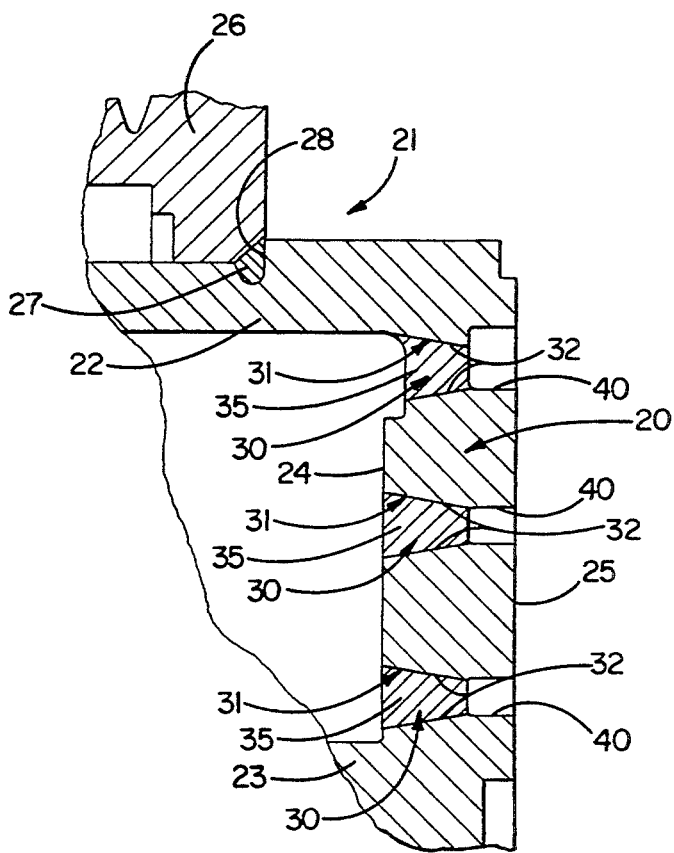
FIG. 3 is an enlarged fragmentary view of a portion of the rotor shown in FIG. 1.

Successive steps of one method of forming the rotor 21 of FIGS. 1–3 are shown in FIGS. 4A, 4B and 4C. After the basic rotor has been blanked and drawn, three annular and circumferentially continuous grooves 41 (FIGS. 4A and 4B) are formed in the non-working face 24 of the disc 20, the grooves terminating short of the working face 25. While the grooves 41 may be created by a machining process, they preferably are formed by an embossing operation and in the manner disclosed in detail in Brown et al U.S. Pat. No. 5,125,255. By embossing the grooves 41 into the disc 20, the walls 32 of the ultimate slots 31 may be formed with a narrow radial width near the working face 25 and may be precisely shaped so as to converge as described above.

After being formed, the grooves 41 are filled with copper-based brazing paste 45 (see FIG. 4B). In addition, the groove 27 in the outer pole ring 22 is filled with brazing paste 47 and the pulley 26 is slipped onto the outer pole ring. The assembly then is placed in a brazing oven to fuse the brazing paste and thereby create solid rings 35 while causing the pulley to become securely attached to the outer pole ring by the braze joint 27. Advantageously, the pulley is brazed to the outer pole ring at the same time the solid rings 35 are formed.

After the brazing process has been completed, the working face 25 of the rotor 21 is machined to remove projections (not shown) resulting from the embossing operation and to true the working face. The grooves 40 are formed in the working face either as an incident to the machining operation or as a separate operation. Upon being formed, the grooves 40 expose the outer ends of the rings 35 as shown in FIG. 4C thereby converting the initially closed-end grooves 41 into the slots 31 and causing well-defined poles to be established on the working face 25 of the disc 20.

A modified rotor 21a is shown in FIG. 5 and is identical to the rotor 21 of FIGS. 1–4 except that the working face 25a is simply machined to a flat and planar condition, and is not grooved as in the case of the rotor 21 of FIGS. 1–4. The forward ends of the rings 35a become exposed when the working face 25a of the rotor 21a is machined.

In the embodiment of the rotor 21b shown in FIG. 6, a radially extending annulus 50 of copper-based brazing material is formed at the non-working face 24b of the rotor. The annulus 50 spans the radial distance between the pole rings 22b and 23b and is intimately joined to the pole rings, to the rings 35b and to the rear faces of the steel sections between the rings. The annulus further strengthens the rotor and adds mass to the rotor to improve its acoustic characteristics. The rotor 21b is especially useful in applications where very high strength is required and where the additional weight of the annulus 50 can be accommodated. In FIG. 6, the working face 25b of the rotor 21b has been shown as being formed with annular grooves 40b but it will be appreciated that the working face could simply be machined to a flat and planar condition as in the case of the rotor 21a of FIG. 5.

FIGS. 7A, 7B and 7C show successive steps of making a rotor 21c which is identical to the rotor 21 of FIGS. 1-4 except that the slots 31c of the rotor 21c are machined and are formed with a stepped configuration. Initially three stepped grooves 41c are machined in the non-working face 24c of the rotor 21c as shown in FIG. 7A. Each wall of each groove has at least one rightangled step, and all of the walls except the radially outermost wall are formed with two right-angled steps. As a result, each groove 41c is significantly wider in a radial direction at the non-working face 24c of the rotor than at the working face 25c so as to achieve substantially the same advantages as the embodiment of FIGS. 1-4.

After the grooves 41c have been formed, they are filled with brazing paste 45c as indicated in FIG. 7B. Following completion of the brazing operation, the working face 25c is machined and, as an incident thereto, grooves 40c (FIG. 7C) are formed in the working face to convert the grooves 41c into slots 31c and to expose the rings 35c. If desired, however, the working face 25c of the rotor 21c may be left flat and planar as exemplified by the rotor 21a of FIG. 5.

FIG. 8 shows a rotor 21d which is identical to the rotor 21c except that an annulus 50' similar to the annulus 50 is located adjacent the non-working face 24d of the rotor. The working face 25d may be formed with grooves 40d as specifically illustrated in FIG. 8 or may be left without grooves as in the case of the rotor 21a of FIG. 5.

I claim:

1. A multiple pole coupling disc for an electromagnetic coupling, said disc comprising a disc member having a central axis and being made of a single piece of low magnetic reluctance material, said disc member having a working face and an opposite non-working face and having inner and outer peripheries, said working face being adapted to engage another coupling disc of the electromagnetic coupling, radially spaced, circular and concentric rows of slots formed in said disc member between said inner and outer peripheries and extending from said non-working face toward said working face, each of said slots being defined by opposing walls, a ring of high magnetic reluctance material disposed in and substantially filling each slot and joined intimately to the walls thereof, each ring being exposed at the working face of said disc member, radially spaced and concentric annular grooves formed in the working face of said disc member and aligned substantially with said rings, and a radially extending annulus of said high magnetic reluctance material joined intimately to the non-working face of said disc member, said annulus being integral with said rings and serving to join the rings to one another adjacent the non-working face of the disc member.

2. A multiple pole coupling disc as defined in claim 1 further including concentric inner and outer pole rings integral with and extending axially from the inner and outer peripheries, respectively, of said disc member, said annulus being intimately joined to said pole rings.

3. A Multiple pole coupling disc as defined in claim 1 further including concentric inner and outer pole rings integral with and extending axially from the inner and outer peripheries, respectively, of said disc member, a drive pulley encircling said outer pole ring, and high magnetic reluctance material intimately joining said drive pulley to said outer pole ring.

4. A multiple pole coupling disc as defined in claim 3 in which said high magnetic reluctance material is copper braze.

5. A multiple pole coupling disc as defined in claim 1 in which the walls of each slot are inclined obliquely relative to said central axis across substantially the entire thickness of said disc member.

6. A multiple pole coupling disc as defined in claim 5 in which the walls of each slot converge toward one another upon progressing from said non-working face to said working face.

7. A multiple pole coupling disc as defined in claim 1 in which each wall of each slot is formed with at least one step, each slot being radially wider at the non-working face of said disc member than at the working face thereof.

8. A multiple pole coupling disc for an electromagnetic coupling, said disc comprising a disc member having a central axis and being made of a single piece of low magnetic reluctance material, said disc member having a working face and an opposite non-working face and having inner and outer peripheries, said working face being adapted to engage another coupling disc of the electromagnetic coupling, radially spaced, circular and concentric rows of slots formed through said disc member between said inner and outer peripheries and extending from said non-working face to said working face, each of said slots being defined by two opposing walls which are inclined obliquely relative to said central axis across the entire thickness of said disc member, a ring of high magnetic reluctance material disposed within and substantially filling each slot and joined intimately to the obliquely inclined walls thereof, each ring being exposed at the working face of said disc member, and radially spaced and concentric annular grooves formed in the working face of said disc member and aligned substantially with said rings.

9. A multiple pole coupling disc as defined in claim 11 in which each ring also is exposed at the non-working face of said disc member.

10. A multiple pole coupling disc as defined in claim 8 further including a radially extending annulus of said high magnetic reluctance material joined intimately to the non-working face of said disc member, said annulus being integral with said rings and serving to join the rings to one another adjacent the non-working face of the disc member.

11. A multiple pole coupling disc as defined in claim 10 further including concentric inner and outer pole rings integral with and extending axially from the inner and outer peripheries, respectively, of said disc member, said annulus being intimately joined to said pole rings.

12. A multiple pole coupling disc as defined in claim 8 further including concentric inner and outer pole rings and extending axially from the inner and outer peripheries, respectively, of said disc member, a drive pulley encircling said outer pole ring, and high magnetic reluctance material intimately joining said drive pulley to said outer pole ring.

13. A multiple pole coupling disc as defined in claim 8 in which said high magnetic reluctance material is copper braze.

14. A multiple pole coupling disc as defined in claim 8 in which the walls of each slot converge toward one another upon progressing from said non-working face to said working face.

15. A multiple pole coupling disc for an electromagnetic coupling, said disc comprising a disc member having a central axis and being made of a single piece of low magnetic reluctance material, said disc member having a working face and an opposite non-working face and having inner and outer peripheries, said working face being adapted to engage another coupling disc of the electromagnetic coupling, radially spaced and concentric rings of slots formed in said disc member between said inner and outer peripheries and extending from said non-working face toward said working face, each of said slots being defined by opposing walls, each of said walls being formed with at least one generally right-angled step, each slot being radially wider at the non-working face of said disc member than at the working face thereof, and a ring of high magnetic reluctance material disposed in and substantially filling each slot and joined intimately to the walls thereof.

16. A multiple pole coupling disc as defined in claim 15 in which each ring is exposed at the working face of said disc member.

17. A multiple pole coupling disc as defined in claim 16 in which the working face of said disc member is substantially flat and planar and in which each ring is substantially flush with the working face.

18. A multiple pole coupling disc as defined in claim 16 further including radially spaced and concentric annular grooves formed in the working face of said disc member and aligned substantially with said rings.

19. A multiple pole coupling disc as defined in claim 16 in which each ring also is exposed at the non-working face of said disc member.

20. A multiple pole coupling disc as defined in claim 15 further including a radially extending annulus of said high magnetic reluctance material joined intimately to the non-working face of said disc member, said annulus being integral with said rings and serving to join the rings to one another adjacent the non-working face of the disc member.

21. A multiple pole coupling disc as defined in claim 20 further including concentric inner and outer pole rings integral with an extending axially from the inner and outer peripheries, respectively, of said disc member, said annulus being intimately joined to said pole rings.

22. A multiple pole coupling disc as defined in claim 15 further including concentric inner and outer pole rings integral with an extending axially from the inner and outer peripheries, respectively, of said disc member, a drive pully encircling said outer pole ring, and high magnetic reluctance material initially joining said drive pully to said outer pole ring.

23. A multiple pole coupling disc as defined in claim 22 in which said high magnetic reluctance material is copper braze.

24. A multiple pole coupling disc as defined in claim 15 in which at least one wall of each slot is formed with multiple right-angled steps.

* * * * *